(No Model.)
B. F. GOODRICH.
BELTING.
No. 270,303. Patented Jan. 9, 1883.
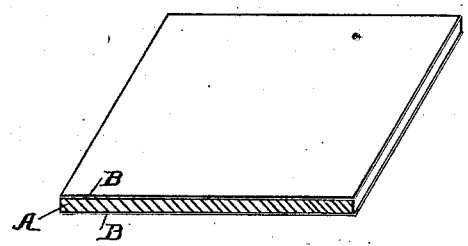
Witnesses:
J. A. Rutherford
A. H. Norris.
Inventor:
Benjamin F. Goodrich,
by C. R. Humphrey
Atty.

UNITED STATES PATENT OFFICE.

BENJAMIN F. GOODRICH, OF AKRON, OHIO.

BELTING.

SPECIFICATION forming part of Letters Patent No. 270,303, dated January 9, 1883.

Application filed May 5, 1882. (No model.)

*To all whom it may concern:*

Be it known that I, BENJAMIN F. GOODRICH, of Akron, in the county of Summit and State of Ohio, have invented a new and useful Improvement in Belting, of which the following is a specification.

My invention has relation generally to that class of belting which consists of a woven fabric covered with and adhering to outside layers of vulcanized rubber. Heretofore it has been customary to make such belting by one of the following methods, to each of which there exist substantial objections: In one a single-ply fabric—such as heavy duck—is used. A sheet of this is "frictioned"—that is, rubber prepared for vulcanizing is, by means of heavy rollers running at different rates of speed, rubbed into the fabric, so as to thoroughly saturate it—and upon one side of this is then placed and pressed a layer of prepared rubber. From this sheet a strip is cut double the width of the desired belt for the outside or cover of the belt. A filling is prepared of strips of frictioned fabric as wide as the belt placed upon each other until the desired strength is obtained. The cover is then folded over this filling, the rubber coat outside, the edges brought together in the center of one side of the belt, and a narrow strip of rubber placed over the joint or seam. The whole is well pressed together, rolled between sheets of metal, and vulcanized. This method is objectionable because the side opposite the seam must always be in contact with the pulley, and when this becomes worn the belt, otherwise strong, is useless. The strip covering the seam frequently becomes loosened, permitting the cover to separate from the filling. The layers of filling, being held together by cohesion of the friction coat, are liable to separate, rendering the belt practically valueless. The additional layers of rubber render the whole stiff and illy adapted to small pulleys, and in cases of great strain, particularly on small pulleys, this coat rolls or rubs up into ridges, making the surface uneven and preventing complete and perfect contact with the pulley. In the other method a close-woven fabric—two, three, or more ply—is used, frictioned. A layer of rubber is then wrapped about it, pressed, and vulcanized in the same manner as in the other method; but this method is also open to the last two objections urged against the former method.

The objects of my invention are to overcome these objections and to produce a belting which shall possess all the water-proof and frictional qualities of ordinary rubber belting and the additional advantages of a perfectly even surface, be thoroughly stretched, and much more flexible than belting of the same strength prepared in the manner before stated.

My invention consists in employing the materials and prepared in the manner following: I take for my foundation a close-woven fabric of three, four, or more ply of the desired width. I then "friction" this—that is, saturate it with rubber prepared for vulcanizing—in the manner before stated, stretch it thoroughly, and while so stretched press it in a hydraulic press between polished metallic plates, and vulcanize it in that condition. By the friction coat I obtain all the advantages of the rubber coat, and by omitting the outside coat of rubber I gain flexibility and avoid the disadvantages enumerated before. The belt comes from the press thoroughly stretched and with a smooth and even surface.

I claim—

The herein-described process of manufacturing belting, which consists in applying to a close-woven multiply-fabric a friction coat of rubber, thoroughly stretching the same, and while stretched pressing it between smooth metallic plates and vulcanizing it in that condition, substantially as and for the purpose hereinbefore set forth.

In testimony that I claim the foregoing I have hereunto set my hand this 31st day of March, A. D. 1882.

BENJAMIN F. GOODRICH.

Witnesses:
C. P. HUMPHREY,
E. W. STUART.